March 4, 1930.  E. W. SWARTWOUT  1,749,168
VEHICLE SIGNAL
Filed Jan. 11, 1921   2 Sheets-Sheet 1
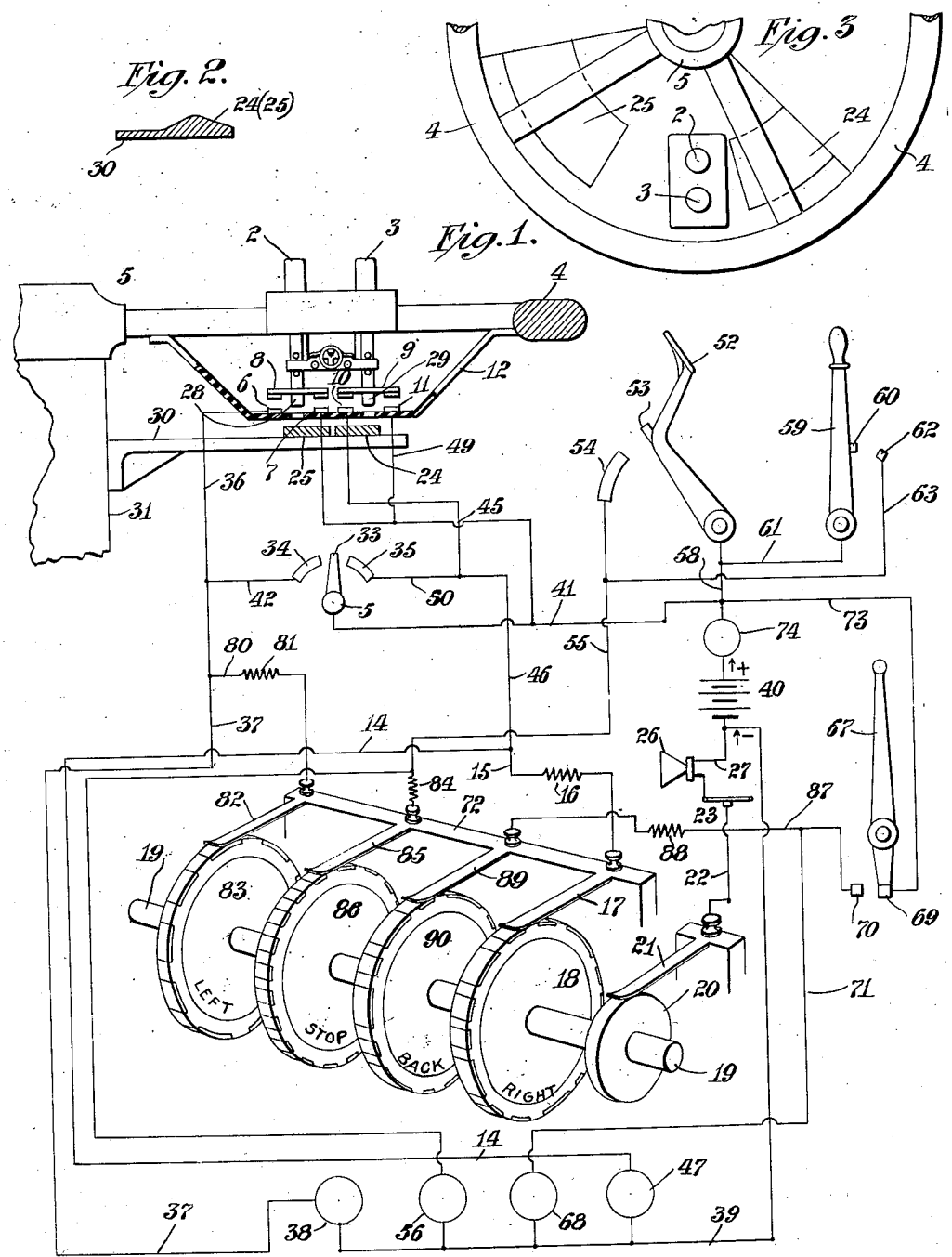

March 4, 1930.  E. W. SWARTWOUT  1,749,168
VEHICLE SIGNAL
Filed Jan. 11, 1921   2 Sheets-Sheet 2

Attest:
Inventor: Everett W. Swartwout,
by Henry J. Lucke, his Atty.

Patented Mar. 4, 1930

1,749,168

UNITED STATES PATENT OFFICE

EVERETT W. SWARTWOUT, OF WHITE PLAINS, NEW YORK

VEHICLE SIGNAL

Application filed January 11, 1921. Serial No. 436,455.

This invention relates to vehicle signals and more particularly to signals for indicating the course of the vehicle to drivers of other vehicles, traffic policemen, pedestrians, etc.

An object of the present invention is to provide attention attracting means associated with means for indicating the intentions of the driver of a vehicle.

A further object of my invention is to provide means whereby a predetermined signal may be operated at will either in a characteristic manner or not.

A second object of the present invention is to provide distinctive signals indicating the various changes in course of the vehicle whereby a single signal will be characteristically controlled in accordance with the course to be taken by the operator of the vehicle.

Another object of the present invention is to control in a simple and efficient manner two forms of signals each appealing to a different sense, as for example, a visual signal and an audible signal.

In accordance with these objects I provide manually operated means to be set in advance of the actual movement of the steering device according to the direction intended to be taken by the driver, combined with suitable means operated by the steering device after the latter has been turned. I also provide automatic means actuated by the foot brake, the emergency brake, or both, for automatically indicating the "stop" indication and actuate a "stop" audible announcer; and further automatic means for setting the "back" indicator and emit a predetermined sound corresponding to "back" upon operation of the reversing device of the vehicle.

The novel features of my invention are particularly pointed out in the appended claims. The invention itself, however, together with further objects and advantages will best be understood from the following description taken with the accompanying drawings, in which Fig. 1 is a diagrammatic view of one form of signaling system according to my invention and indicates the electrical connections between the several parts thereof;

Fig. 2 is a detail vertical section on line 2—2 of Fig. 3 of the restoring cam;

Fig. 3 is a top plan view of the steering wheel and one form of means for attaching the restoring cams;

Figures 4, 5:
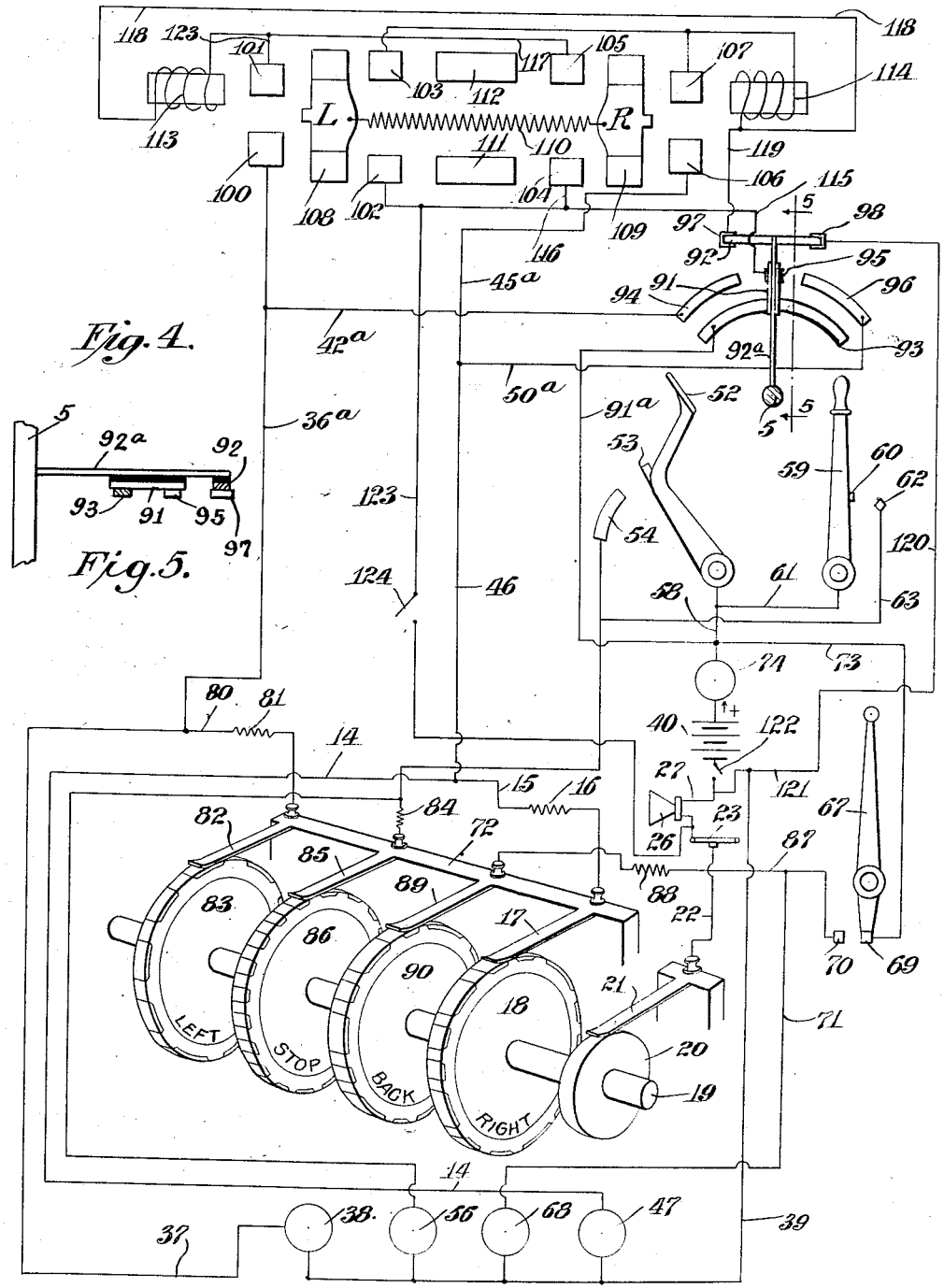
Fig. 4 is a diagrammatic view similar to Fig. 1, illustrating the preferred form of signalling system according to my invention.
Fig. 5 is a detail sectional view on line 5—5 of Fig. 4.

Referring to Fig. 1, the plungers 2, and 3 are preferably arranged in close relation with the steering wheel so they may be manipulated by the operator easily. 4 indicates the steering wheel mounted on the usual steering post, 5 and to said rim is attached the protecting and insulating casing 12. Suitably mounted upon the insulating casing 12 and insulated from each other are the contacts 6 and 7 coacting with the contact piece 8 of the plunger 2. The contact piece 8 establishes electrical connection between the members 6 and 7 upon the operation of the plunger 2. Similarly, there are mounted upon the insulating casing 12 the contacts 10, 11 and the contact piece 9 suitably mounted on the heel piece of the plunger 3 is provided to coact therewith for establishing electrical connection between the contacts 10 and 11 upon operation of the plunger 3.

The plungers 2 and 3 may be mechanically interconnected to permit the operation of solely one at a time by means of a mechanism such as that disclosed in my U. S. Patent No. 1,365,127 granted January 11th, 1921.

Fixed to the column 31 of the steering post 5 is a support 30. Carried on support 30 are two cam blocks 24, 25, the raised or cam portions, see Fig. 2, of which are oppositely located relative to the neutral position of the steering wheel 4, as illustrated in Fig. 3. Cams 24 and 25 cooperate with the heels 28 and 29 respectively of the plungers 2, 3. The cams 24 and 25 are so formed and so related to the steering post 5 that when the car is being driven straight ahead the cams do not interfere with the pushings down of the plungers 2, 3, to bring bridge contact 8 into contact with contacts 6, 7, or bridge contact 9 into contact with contacts 10 and 11. The neutral position of the steering wheel 4 and the neutral portions of the cams 24, 25, are shown in Fig. 1, and accordingly the neutral portions of the cams 24, 25 may be omitted as shown in Fig. 3, if desired. Cams 24 and 25 are, however, tapered so that when the post 5 is turned a given amount in either direction from the straight ahead position, one cam or the other will come into contact with the lower end of plunger 2 or plunger 3 as the case may be. For instance, if the plunger 3, causing an indication of a turn to the right, has been pressed down and then the wheel is turned to the left, the cam 24 will come into contact with the heel 29 of the plunger 3. Further movement of the steering wheel 4 toward the left forces the thicker or more elevated portion of the cam 24 under the heel 29, thereby elevating plunger 3 and opening the circuit of the corresponding indicator at contacts 10 and 11. If, however, the plunger 2 had been depressed and the steering wheel 4 is then turned to the left, whereby to turn the vehicle to the left, plunger 2 would not be interfered with, but the accidental or malicious operation of plunger 3 would be prevented by cam 24. Obviously the relationship just described is reversed upon turning the steering wheel to the right, the cam 25 being then thrown under the plunger 2.

The radial arm 33 affixed to the steering post 5 is constructed to turn with said steering post and to coact with the contact segments 34 and 35.

The foot brake 52 is provided with contact 53 adjusted to cause electrical connection between the contacts 53 and 54 upon partial depression of the foot brake 52. The hand brake 59 is provided with the contact 60 for engagement with contact 62 upon the operation of the hand brake lever 59. The reversing lever 67 is similarly provided with a contact 69 which establishes electrical connection with contact 70 upon operation of the reverse lever 67 beyond a predetermined extent.

Circuit controllers 18, 83, 86 and 90 and collecting drum 20 are mounted upon the shaft 19, and are rotated in any well known manner by the shaft of the engine, the propeller shaft of the vehicle or any other rotating shaft of the vehicle. Each of said circuit controllers comprises insulated and contact segments, the conducting segments of each controller being connected together and to the collecting drum 20 in any suitable manner. Contact brushes 17, 82, 85, 89 and 21 are mounted on the frame 72 of the vehicle and are each insulated therefrom and are adjusted to slidably engage the peripheries of the circuit controllers 18, 83, 86, 90 and collecting drum 20, respectively.

38, 47, 56, and 68 designate signals, such as lamp signals, by means of which the course of the vehicle is visibly indicated. 26 designates a signal such as an electrically operated horn and in combination with the several circuit controllers aforesaid indicates audibly the course of the vehicle.

The circuit controllers are each provided with a series of insulating and conducting segments of varying lengths in different combinations. The circuit controller 86 is provided with a plurality of relatively short contact segments equally spaced from each other. The circuit through said controller and the contact brush 85 is regularly intermittently opened and closed at a relatively high rate. The circuit controller 83 is provided with relatively long conducting segments equally spaced and thus the circuit through this controller and the conducting brush 82 is regularly intermittently opened and closed at a relatively low rate of speed. The circuit controller 90 is provided with alternatively long and short conducting segments and the circuit through it and the conducting brush 89 is first closed for a relatively short interval and then a relatively long interval; and the circuit controller 18 is provided with a series of conducting segments in the order: long-short-short, thus producing in combination with the conductor brush 17 a correspondingly characteristic series of pulsations in the electrical circuit through it.

The operation of the indicating device of my invention is as follows: Upon depressing the "left" button 2 a circuit is closed from the battery 40, and through the pilot signal 74, conductor 41, contacts 7, 8, and 6, conductors 36, 37, lamp 38, conductor 39, to the opposite pole of battery 40, thus lighting lamp 38. The plunger 2 is manipulated when the driver desires to turn in a left hand direction and accordingly the lamp 38, which may be mounted at the rear of the machine or in any desired part thereof, is designated "left." A parallel circuit is also closed from the battery 40, through the pilot signal 74, conductor 41, contacts 7, 8 and 6, conductors 36, 80, resistance 81, conducting brush 82, circuit controller 83, which is electrically connected to the conducting drum 20, conducting brush 21, conductor 22, switch 23, audible signal device 26, conductor 27, to the opposite pole of battery 40. The audible signal 26, is thus intermittently operated in accordance with the character of circuit pulsations produced by the circuit controller 83 which in this case is a series of regular long closures and a distinctive character of tone or noise is thus produced by the device 26 and will be recognized by persons hearing it as an indication that the driver is about to drive to the left.

Such visual and audible indications may be caused when the vehicle is at a standstill or is being driven straightaway. Upon the actual turning the steering wheel 4 to the left to and beyond a predetermined point, the radial contact 33 contacts with the contact segment 34 and establishes a circuit from the battery 40 through pilot signal 74, contact 33, contact segment 34, conductor 42, independently of the contact established between contacts 6, 8, and 7. The cam 25 will operate to restore the heel piece 28 and the plunger 2 to normal position. It will thus be seen that in case of error by the driver in depressing the button, the error will automatically be corrected upon actually turning the steering wheel.

After the vehicle has been turned and the steering wheel resumes its normal position the radial arm 33 opens the circuit to the contact segment 34 and the apparatus resumes its normal condition.

In anticipation of making a right hand turn the driver depresses the plunger 3 and establishes an electrical connection between contacts 9, 10 and 11. A circuit is then closed from battery 40, pilot signal 74, conductors 41, 49, contacts 11, 9, and 10, conductors 45, 46 and 14, visual indicating signal 47, conductor 39, battery 40, causing the actuation of the visual signal 47. A circuit is also closed from the battery 40, through the pilot signal 74, conductor 41, 49, contacts 11, 9 and 10, conductors 45 and 46, 15, resistance 16, conducting brush 17, circuit controller 18, which is electrically connected to the collecting drum 20, collecting brush 21, conductor 22, switch 23, audible signal device 26, conductor 27 to the opposite pole of battery.

The device 26 is now under control of the circuit controller 18 which produces a series of pulsations of the character; long-short-short as aforesaid. There is consequently produced by the device 26 a sound or noise of corresponding character. The lighting of the lamp 47 and the production by the device 26 of this character of noise or tone indicates to others that the direction which the driver of the vehicle is about to take, is to the right. It will be understood that cam 24 operates in the same manner in relation to the plunger 3 as was the case in the previous example with cam 25 and plunger 2.

The radial arm 33 and the contact segment 35 provide a circuit from the battery 40, through the pilot signal 74, radial arm 33, segment 35, conductor 50, independent of the contacts 9, 10, and 11, upon the operation of the steering wheel 4. Thus the setting of the signals is maintained while the radial arm 33 is in "right" position.

When making a stop the driver of the vehicle partially or wholly depresses the foot brake 52 and a circuit is then closed as follows: Battery 40, pilot signal 74, conductor 58, contacts 53 and 54, conductor 55, lamp 56, conductor 39, to battery 40 and a circuit is also closed through resistance 84 and circuit controller 86 for the audible signal device 26. The horn 26 thereupon operates under control of the short, regular pulsations produced by circuit controller 86 and consequently produces a characterized noise or tone. As alternative to the contacts 53, and 54 this circuit may also be closed by the contacts 60 and 62 through the conductors 61 and 63 when the hand brake 59 is operated. The lighting of the lamp 56 and the peculiar noise or tone produced by the horn 26 are indicative of the driver's intention to stop the vehicle.

Similarly the reversing lever 67 controls the circuit of the "back" lamp 68 and by means of the circuit controller 90 causes the actuation of the audible signal device 26, and by means of the series of alternately long and short pulsations, in the circuit of the device 26, there is produced a characteristic noise or tone, recognized as an indication that the vehicle is to be driven in the reverse direction.

The switch 23 is provided to open the circuit of the audible device 26 when the operation of this device is not desired, as, for example, when the car is standing still, or when passing through hospital zones or any other zone of quiet.

The resistances 16, 81, 84, 88 are of such value as to limit the current through conductors such as 15 and 80 and to provide for illumination of a lamp other than the one desired. These resistances are of sufficiently low value, however, to permit the operation of the horn 26 in the several circuits described above.

Referring to Fig. 4, I have herein illustrated an apparatus having many parts which may be identical with parts in Fig. 1. Such parts are numbered the same in both figures. In Fig. 4, 96 is a stationary contact arc concentric with steering post 5. Fixed to the post 5 are two contact arms 91 and 92. Contact arm 91 cooperates with contact arcs 93, 94, 95, 96, and contact arm 92 cooperates with contact arcs 97 and 98. Arc 93 is preferably circular, having the post 5 at its center. Arcs 94, 95, 96 are placed on a curve concentric to arc 93. When the vehicle is being driven straight ahead the arm 91 connects arc 93 with arc 95, when the vehicle is turned to the left arcs 94 and 93, and when it is turned to the right arcs 93 and 96 are thus connected, but the connection between 93 and 95 is broken whenever the vehicle is turned to the right or left to any material degree. When the vehicle is being driven straight ahead, also, post 5 is in such position that contact arm 92 connects contact arcs 97 and 98. However, when the vehicle is turned to either right or left contact is broken between contact arcs 97 and 98. As one form of such movable contacts 91 and 92, see also Fig. 5, the same are mounted on any suitable radial arm 92ª of any suitable insulation material, suitably fixed to the steering post 5, the contact 91 being of any suitable conducting material carried by the insulating arm 92ª to bridge the contact arcs 93 and 95 when the arm 92ª, i. e. steering post 5, is in straight-ahead position, and similarly the contact 92 of any suitable conducting material is mounted transversely at the end of the insulating arm 92ª to bridge the contacts 97 and 98, when the steering post 5 is in straight ahead position; and similarly the movable contact 91 bridges the contact arcs 93 and 94 when the steering post 5 is in its "left" position while the movable contact 92 is moved out of connection between the contacts 93 and 95; and similarly the movable contact 91 bridges the contact arcs 93 and 96 when the steering post 5 is in its "right" position, while the movable contact 92 is moved out of connection between the contacts 97 and 98, as is described hereinabove. As will be seen more clearly when the description of Fig. 4 is completed, parts 91, 93, 94 and 96 perform the same functions as parts 33, 34, and 35 of Fig. 1, noting, however, that the steering post 5 does not serve to carry any electrical current in the circuits of Fig. 4, as indicated in the diagram of Fig. 4, while parts 92, 95, 97 and 98 form part of an arrangement performing the functions of the plungers 2, 3, and cams 24, 25 of Fig. 1 and which will now be described.

The arrangement just mentioned comprises stationary contacts 100, 101, 102, 103, 104, 105, 106 and 107, arranged in two parallel rows, the even numbered contacts in one row and the odd numbered contacts in the other. Contacts 100 to 107 inclusive are placed opposite in the rows so that they may be connected in pairs by movable bridge pieces 108 and 109, contact 100 to 101, contact 102 to 103, contact 104 to 105, and contact 106 to 107. In Fig. 4, the positions of the left hand bridge piece 108 (indicated also L) and the position of the right-hand bridge piece 109 (denoted also R) are neutral positions respectively. Bridge piece 108 cooperates with contacts 100 to 103 inclusive, and bridge 109 with contacts 104 to 107 inclusive. The bridge pieces, moreover, are connected by a spring 110 so that when piece 108 is moved to the left to connect contact 100 to 101, piece 109 is drawn to the left and connects contact 104 to 105. Also when piece 109 is moved to the right to connect contact 106 to contact 107, piece 108 is drawn to the right and connects contact 102 to contact 103. Stops 111 and 112 are placed between contacts 102 and 104 and between contacts 103 and 105 respectively to limit the inward movements of bridge pieces 108 and 109 respectively.

When bridge piece 108 connects contact 100 to 101 the bridge piece is releasably held in this position by electro-magnet 113. Similarly, when bridge piece 109 connects contact 106 to contact 107, piece 109 is releasably held in this position by electro-magnet 114. When the bridge piece 108 and therewith the bridge piece 109 are manually moved to their left hand positions, and the vehicle is being steered straight ahead, the circuit of electromagnet 113 runs from battery 40 through the pilot lamp 74 and conductor 91ª to contact arc 93, bridge piece 91, contact 95, conductor 115, conductor 116, contact 104, bridge piece 109, contact 105, conductor 117, winding of electro-magnet 113, conductor 118, conductor 119, contact 97, bridge piece 92, contact 98, conductor 120, conductor 121, switch 122 to the other side of battery 40. At the same time a circuit is formed from battery 40 to the conductor 117 in the manner just described, thence to contact 101 through conductor 123 and across bridge piece 108 to contact 100, thence through conductor 36ª, to conductor 80, resistance 81, and thence commutator 83, shaft 19, collector ring 20, brush 21, switch 22 and signal 26 to battery 40 as in Fig. 1 similarly as in the arrangement in Fig. 1, the circuit is closed from the conductor 36ª, through the conductor 37, indicating lamp 38, return lead 39, switch 22 through the battery 40. If now the steering wheel and its post 5 are turned to the left, bridge piece 91 will now connect arc 93 with arc 94 and a circuit is completed from the battery 40 to arc 93 as previously described, thence through piece 91 and arc 94 to conductors 42ª, 36ª, to conductor 37, and thence to battery 40 through commutator 83 and signal 38 as before. When steering post 5 is turned, the circuit through electro-magnet 113 is broken upon the movement of the bridge piece 91 away from contact 95, and also by moving bridge piece 92 away from contact 98. The bridge piece 108 being now no longer attracted by the magnet 113 is drawn by spring 110 away from contacts 100 and 101 and the circuit of signals 83 and 38 are thereby broken between contacts 100 and 101, but the current in these signals is reestablished by bridge 91 making connection between arcs 93 and 94 with wire 36ª and remainder of circuit through wire 37 also through the indicating lamp 38, the commutator 83 and the horn 26. When now steering wheel and its post 5 are moved back to its neutral or straight ahead position, the signals no longer operate, by reason of the open-circuiting of the signal circuits traced hereinabove.

If after moving bridge member 108 to the left to operate signals 38 and 26 as just described, it is decided not to turn the vehicle to the left, the bridge 109 is then moved to the right thus breaking the circuit of electromagnet 113 between contacts 100 and 101 and stopping their operation.

A further movement of bridge member 109 to the right connects contacts 106 and 107 and also draws bridge member 108 against stops 111 and 112, thus placing bridge member 108 where it connects contacts 102 and 103. In this position of bridge members 108 and 109 the proper circuits are closed whereby signals 47 and 26 are operated thus indicating that the vehicle is to turn to the right. At the same time the circuit of electromagnet 114 is closed, this magnet serving to hold bridge 109 in position across contacts 106 and 107. The operating circuits of the signals 47 and 26 are then as follows: from battery 40 through 74, 91$^a$, 93, 91, 95, 115, 102, 108, 103, 107, 109, 106, 45$^a$, 46, 14, 47, 39, 121 and 122 to battery 40. The circuit of holding magnet 114 is at the same time, as follows from battery 40 through parts 74, 91$^a$, 93, 91, 95, 115, 102, 108, 103, 114, 119, 97, 92, 98, 120, 122, to battery 40. The electromagnets 112 and 113 are strong enough to hold the bridge pieces 108 and 109 respectively when these bridge pieces are moved adjacent the respective electromagnets, but are not strong enough to attract the bridge pieces from their distant position shown in Fig. 4.

When the steering wheel and its post 5 are turned to the right, bridge 92 no longer connects contacts 97 and 98, and the circuit holding magnet 114 is broken between these two contacts thus permitting spring 110 to pull bridge member 109 to the left and breaking the signal circuits between contacts 107 and 106. At about the same time that this occurs, however, the post 5 continuing to turn to the right, bridge 91 connects arc 93 with arc 96, thus reestablishing the signal circuits by connecting lead 93$^a$ to lead 46 through parts 93, 91, 96 and 50$^a$. The remaining part of the circuit of signals 47 and 26 are then identical with those stated in the preceding paragraph.

From the above as will be noted that the contact member 109 bridges the contacts 104 and 105 when the contact member 108 is normally pre-set to "left" position, i. e., to bridge the contacts 100 and 101, at which stage the neutral contacts 93 and 95, of the steering device contacts are bridged by the contact 91 and the neutral contacts 97 and 98 are bridged by the contact 92. Should the driver or operator desire to "cancel" such pre-set "left" position, the bridge member 108 upon being moved from its set "left" position interrupts the circuit and extinguishes the "left" signal 83. In like manner, should the operator after pre-setting the "left" bridge member 108, desire to change to the pre-set "right" position the "right" member 109, bridging the contacts 104 and 105 in the then formed circuit, as hereinbefore described, interrupts the circuit across the contacts 104 and 105 upon manually moving the "right" member 109 to the right, de-energizing the electromagnet 113, and establishes electrical connection across the contacts 106 and 107 to close the circuit through the "right" lamp 47 or "right" signal 18, as described hereinabove. In such changes of pre-setting, the neutral contacts 95, 97 and 98 function in the electrical circuits similarly as when cancelling a pre-set left indication.

In a similar manner, a pre-set "right" indication may be cancelled or changed to a pre-set "left" indication respectively manually returning the "right" manual bridge member 109 to its neutral position or by manually setting the "left" bridge member 108.

I also may provide means, as illustrated in Fig. 4 whereby the signal 26 may be used or sounded as desired independently of any commutator or of any other signal. This means comprises a lead 123 connecting leads 115 and 22, and a normally open, manually controlled switch 124 in lead 123. It is evident that upon closing switch 124, the circuit of signal 26 is completed from battery 40 through parts 74, 93$^a$, 93, 91, 95, 115, 123, 124, 22, 23, 26, and 122 to battery 40.

It is evident also that the operation of all the signals may be prevented when desired by opening the switch 122.

The remaining parts illustrated in Fig. 4 are identical in function with parts described in connection with Fig. 1 and have been given numbers in Fig. 4 identical with those of the corresponding parts in Fig. 1.

The operation of the form of apparatus illustrated in Fig. 4 is so similar to that in Fig. 1 that no additional statement of the operation of the apparatus of Fig. 4 is necessary.

From the above, it will be noted that upon presetting the manually operative member either to the "left" or to the "right," the operation of the steering wheel subsequent to the setting of the manually operative member deenergizes the holding magnet of the manually operative member which thereupon returns to neutral; also, upon operation of the steering wheel in either direction subsequent to manual setting of the manually operative member in either direction renders the manually operative member ineffectual until the steering wheel is returned to its neutral position and that the indicating means upon such subsequent operation of the steering wheel is energized through a circuit which is unaffected by the bridge members of the manually operative member and is otherwise independent of the manually operative member. In such event, if the manually operative member has been set, say to the "left" and the steering wheel subsequently turned to the "right," the "left" indicator is de-energized and the "right" indicator becomes energized.

It will be also seen that I have provided an arrangement whereby the attention of neighboring persons may be attracted to a vehicle fitted with my invention when desired and whereby the nature of an impending change of course or change of speed of the vehicle may, at the same time, be communicated to such persons, and that the audible indication may be interrupted or continued at the will of the operator by means of the switch 23.

Whereas I have illustrated and described my invention by reference to specific forms thereof it will be understood that many changes and modifications may be made without departing from the invention defined by the appended claims.

I claim:

1. In a vehicle having a steering device, the combination with a plurality of indicating means; of means operative automatically upon movement of the steering device for operating said indicating means corresponding to the direction of movement of the steering device; said steering device automatically operated means comprising contact means controlled by said steering device, a set of contacts engaged by a contact arm supported on said steering device for the neutral position of said contact means and sets of contacts respectively for the "left" and "right" positions of said contact means; manually operable, electrically held means comprising separate manually operated "left" and "right" members for setting said indicating means in advance of the operation of said steering device, said manually operable, electrically held means comprising electro-magnetic means for holding said manually operated means in set position prior to the operation of said steering device; and electrical circuit means for energizing said electromagnetic means when said contact means is in neutral position and for de-energizing said electromagnetic means when said contact means is in either its "left" or its "right" position.

2. In a vehicle having a steering device, the combination with a plurality of indicating means; of means operated automatically in the direction of movement of the steering device, said steering device automatially operated means comprising contact means, a set of contacts engaged by a contact arm supported on said steering device for its neutral position and sets of contacts for its "left" and "right" positions respectively; manually operable, electrically held means for setting said indicating means, said manually operable electrically held means comprising separate manually operated contact members respectively for its "left" and "right" positions and electromagnetic means for holding said "left" or "right" contact member in its set position, and electrical circuit means connecting said set of contacts for the neutral position of said contact means with the set contact member when the steering device is in neutral position.

3. In a vehicle having a steering device, the combination with a plurality of indicating means; of means operated automatically in the direction of movement of the steering device, said steering device automatically operated means comprising contact means, a set of contacts engaged by a contact arm supported on said steering device for its neutral position and sets of contacts for its "left" and "right" positions respectively; manually operable, electrically held means for setting said indicating means, said manually operable electrically held means comprising separate manually operated contact members respectively for its "left" and "right" positions and electromagnetic means for holding said "left" or "right" contact member in its set position, and electrical circuit means connecting said set of contacts for the neutral position of said contact means with the set contact member when the steering device is in neutral position, and for completing an electrical circuit through said indicating means independently of said contact members upon movement of the steering device from its neutral position.

4. In a vehicle having a steering device, the combination with a plurality of indicating means; of means operative automatically upon movement of the steering device for operating said indicating means corresponding to the direction of movement of the steering device, said automatically operated means comprising contact means controlled by the steering device, a set of contacts engaged by a contact arm supported on said steering device for the neutral position of said contact means, a set of contacts for said contact means when in "left" position and a set of contacts when said contact means is in "right" position; manually operable, electrically held means comprising separate manually operated "left" and "right" members for correspondingly setting said indicating means in advance of the operation of the steering device; and electrical circuit means connecting said set of contacts for the neutral position of said contact means with said manually operable, electrically held means when the steering device is in neutral position.

5. In a vehicle having a steering device, the combination with a plurality of indicating means; of means operative automatically upon movement of the steering device for operating said indicating means corresponding to the direction of movement of the steering device, said steering device automatically operated means comprising contact means controlled by the steering device, a set of contacts engaged by a contact arm supported on said steering device for the neutral position of said contact means and sets of contacts respectively for the "left" and "right" positions of said contact means; manually operable, electrically held means comprising separate manually operated "left" and "right"

members for correspondingly setting said indicating means in advance of the operation of the steering device, said manually operable, electrically held means comprising electromagnetic means for holding said manually operable means in set position prior to the operation of the steering device; and electrical circuit means connecting said set of contacts for the neutral position of said contact means with the said manually operable, electrically held means when the steering device is in neutral position.

6. In a vehicle having a steering device, the combination with a plurality of indicating means; of means operative automatically upon movement of the steering device for operating said indicating means corresponding to the direction of movement of the steering device, said steering device automatically operated means comprising contact means, a set of contacts engaged by a contact arm supported on said steering device for the neutral position of said contact means and sets of contacts respectively for the "left" and "right" positions of said contact means; manually operable electrically held means for setting said indicating means, said manually operable, electrically held means comprising separate manually operated members respectively for its "left" and "right" positions; and electrical circuit means connecting said set of contacts for the neutral position of said contact means with the set member of said manually operable means when the steering device is in neutral position.

7. In a vehicle having a steering device, the combination with indicating means, of means operated automatically upon movement of the steering device to set said indicating means corresponding to the direction of movement of the steering device, said steering device automatically operating means including contacts of the neutral position of the steering device, and separate manually operable "left" and "right" members for presetting said indicating means in advance of the operation of said steering device, said manually operable means comprising a plurality of contact makers, a plurality of contacts for each contact maker, electromagnetic means for holding said contact makers respectively in set position relative to said plurality of sets of contacts and electrical circuit means including said neutral position contacts whereby upon manual return of the pre-set "left" or "right" member to neutral position, said electromagnetic means is de-energized and said indicating means is restored to non-set position.

8. The combination with a vehicle provided with a steering mechanism, a plurality of electrical signal circuits, and a source of power, of manually operable switching means for selectively controlling said circuits, and switch means controlled by said steering mechanism for selectively controlling said circuits and for connecting and disconnecting said source of power with respect to said manually operable switching means, said steering control switch means comprising a first contact connected with the manually operable switch means and a pair of contacts connected with the signal circuits, respectively, and a movable contact connected with a source of power and connected with said first contact in medial position of the steering mechanism and with one or the other of said pair of contacts when the steering mechanism is moved a predetermined amount in one direction or the other from medial position.

9. The combination with right and left hand electric signal circuits of a vehicle and a source of current of manually operable switch means for controlling said circuits, comprising a stick switch mechanism for controlling the signal circuits, said switch mechanism comprising a pair of contacts connected with said signal circuits, respectively, two separate switch arms respectively carrying contacts engageable selectively with one or the other of said signal circuits and a stick magnet for holding the switch arm in engaged position, said magnet and said contacts respectively being in series between the source of current and the signal circuits.

10. The combination with a vehicle provided with a steering mechanism of a signal for indicating turns, a circuit therefor including a source of current, manually operable switching means for controlling said circuit in advance of making a turn, and switching means operable by movement of said steering mechanism to make a turn for controlling said circuit and for disconnecting said source of current from said manual switching means.

11. The combination with a vehicle provided with a steering mechanism of a plurality of direction signal means, electrical circuits therefor, a source of power, manually operable switching means for selectively controlling said circuits and switch means controlling said direction signal means and controlled by said steering mechanism whereby said manually operable switching means is released while maintaining said selected signal.

12. The combination with a vehicle provided with a steering mechanism of a plurality of electrical signal circuits, a source of power, manually operable switching means for selectively controlling said circuits to indicate by signal a turn to the "right" and a turn to the "left", said manually operable switching means including contacts, means for restoring said manually operable switching means to neutral position, said contacts being connected with said electrical signal circuits and electro-magnetic means for holding said manually operable switching means in either of its operated positions, and switch means controlling said electro-magnetic means and controlled by turning said steering mechanism in the direction indicated whereby said manually operable switching means is released and said signal is maintained until after said turn has been made and said steering wheel returned to "straight ahead" position.

13. The combination with a vehicle provided with a steering mechanism of a plurality of electrical circuits, a source of power, manually operable bridge members for selectively controlling said circuits, an electro-magnet for each bridge member, contacts for each of said bridge members, a connection between said bridge members, contacts so arranged with relation to said bridge members that one bridge member contacts to complete the circuit for energizing the electro-magnet for holding the other bridge member, means for restoring said manually operable bridge members to neutral position upon release from its electro-magnet and switch means controlled by turning said steering mechanism in the direction indicated whereby said manually operable bridge member is released and said signal is maintained until after said turn has been made and said steering wheel returned to straight ahead position.

14. The combination with a vehicle having a steering wheel mechanism, of a plurality of electrical signal circuits, a source of power, manually operable bridge members for selectively controlling said circuits, an electro-magnet for each bridge member, two pairs of contacts for each of said bridge members so arranged that when either of said members is operated to the "left" or to the "right" the other member bridges one of its pairs of contacts to energize the electromagnet of the other bridge member to retain the same in position, means for restoring said manually operable bridge members to neutral position upon release from its electro-magnet and switch means controlled by said steering mechanism for selectively controlling said circuits and for connecting and disconnecting said source of power with respect to said manually operable switching means.

15. The combination with a vehicle provided with a steering mechanism of a pair of signals indicating turn to the right and turn to the left respectively, circuits therefor including a source of current, manually operable switching means for selectively controlling said circuits, and switching means normally connecting said source of current to said manual switching means and operable by movement of said steering mechanism a predetermined amount to disconnect said source of current from said manual switching means and thereafter directly and exclusively control said circuits selectively.

16. The combination with a vehicle provided with a steering mechanism of a pair of signals indicating turn to the right and turn to the left respectively, circuits therefor, including a source of current, manually operable switching means for selectively controlling the circuits and switching means operable by movement of said steering mechanism for selectively controlling said circuits for disconnecting said source of current from said manual switching means.

In testimony whereof I have signed this specification this 3rd day of January, 1921.

EVERETT W. SWARTWOUT.